DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 8, 1972

901 O.G. 415

T901,019

RADIOGRAPHIC ELEMENTS AND BINDERS

George P. Kasper and John H. Taylor, both % Eastman Kodak Co., Kodak Park Division, Rochester, N.Y. 14650

Filed Mar. 4, 1971, Ser. No. 121,120
Int. Cl. G03b *41/16*
U.S. Cl. 250—65 R
No Drawing. 25 Pages Specification

Phosphorescent radiographic screens comprising a phosphor having a host matrix of at least one heavy metal ion having a physical density greater than about 4.1 gm./cm.$^3$ dispersed in a binder comprising a combination of (1) a copolymer of ethyl acrylate with a halo alkyl vinyl ether and (2) an alkyl methacrylate polymer, each in a weight ratio range of from about 2 to 1 to about 50 to 1 respectively are disclosed. Particularly effective phosphors include those whose emission is more than half in the ultraviolet region such as gadolinium activated yttrium oxide, europium activated barium strontium sulfate, lead activated barium sulfate and rare earth activated heavy metal ion phosphors.

The binder is typically represented by combinations of (1) n-butyl methacrylate resins and (2) haloalkyl vinyl ethers whose alkyl moiety contains 1 to 6 carbons, e.g. dry rubbers or elastomers.

Said screens, when combined with light sensitive radiographic elements, exhibit improved optical and physical characteristics. The screens can further comprise a support containing a 5(H)furanone ultra-violet light absorber, e.g. 5-benzylidene - 3 - carbamoyl-4-phenyl-2(5H)furanone.

Silver halide emulsions and elements useful in combination with the above screens can be chemically sensitized, e.g. with noble metal sensitizers alone or in combination with sulfur or selenium sensitizers. They can contain spectral sensitizers, incorporated color-forming couplers, incorporated developing agents, antifoggants, hardeners, plasticizers, coating aids, vinyl polymers, and other suitable photographic addenda such as described in U.S. Pat. 3,297,446 of Dunn issued Jan. 10, 1967 (columns 4 to 9).